Patented Aug. 14, 1945

2,382,305

UNITED STATES PATENT OFFICE 2,382,305

MANUFACTURE OF BAKED GOODS

Jacob Freilich, Bronx, and Charles N. Frey, Scarsdale, N. Y., assignors to Standard Brands Incorporated, New York, N. Y., a corporation of Delaware No Drawing. Application May 12, 1943, Serial No. 486,734

6 Claims. (Cl. 99—90)

The invention relates to a method for the manufacture of baked goods. More particularly, it pertains to a procedure for the production of leavened baked products, and includes correlated improvements and discoveries whereby such may be obtained.

It is an object of the invention to provide a method whereby leavening of baked goods may be accomplished without the action of yeast.

A further object of the invention is to provide a procedure for the manufacture of baked goods in which leavening is effected by suitable gas of relatively high water solubility and preferably under pressure somewhat greater than atmospheric.

Another object of the invention is the provision of a method for the production of non-yeast leavened baked products which may be readily, effectively and economically practiced on any desired scale.

A more specific object of the invention is to provide a method for the manufacture of leavened bread by mixing ingredients to form a dough in the presence of an inert gas having a solubility in water of at least four to one, desirably under pressure upwards from about five pounds per square inch, and with correlation of mixing time, temperature, pH value of the dough and water absorption.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention leavened baked goods may be manufactured by mixing flour, water and other ingredients, without yeast, to form a dough in the presence or under the influence of an inert, i. e. a non-reactive gas having a relatively high solubility and under pressure greater than atmospheric. Various gases may be utilized, such as dimethyl ether, methyl chloride and monomethyl amine, which are soluble in water at atmospheric pressure and temperature of about 20° C. in the relative proportions, respectively, of 37, 4 and 12 to 1, and dimethyl amine, monoethyl amine and trimethyl amine, all of which are very soluble in water under the aforesaid conditions. The formation of the dough may be effected in a suitable mixer, as a Readco vacuum-pressure mixer, and may be attained by an initial removal of air through evacuation, followed by introduction of an inert gas, e. g. methyl chloride at a suitable pressure.

Further, the making of the dough may entail the addition of an amount of water which is sufficient to give an absorption of from 54 to 66%, preferably 58 to 62%, with mixing for a period of at least six minutes in the presence of the inert gas of relatively high water solubility and suitably under a pressure upwards from about five pounds per square inch, and a temperature which may be from 60° to 90° F., specifically around 80° F. When the dough has been formed it is substantially immediately baked by dividing, e. g. by means of a suitable extruder, with as little loss of gas as possible, placing in pans, and then in the oven where it may be baked at a temperature of about 210° C. for about thirty-five minutes.

Moreover, where a more pronounced proteolytic action is desired or, in the event that a flour is being utilized which has a low proteolytic enzyme content, the ingredients may include a suitable proteolytic enzyme, as papain and bromelin. The amount of papain added may be about 10 mg. and upwards to about 50 mg. for each loaf containing 300 grs. of flour. There may also be included in the dough mix a small amount of a bromate whereby gluten is conditioned, and which may be present in an amount ranging, for example, from 4 to 25 mg. per 300 grs. of flour. the papain and the bromate may be included, if desired, in conjunction with an acid, as hydrochloric acid. In order to simulate the yeast flavor the dough mix may contain also an edible acid substance, more especially an organic acid, and specifically tartaric, lactic, citric, acetic, hydrochloric and phosphoric acids, or this result may be attained through the addition of certain esters, glycerol, acetyl methyl carbinol, diacetyl and alcohol which arise during the usual yeast dough fermentation. A satisfactory acidity is that which is represented by a pH value of about 5.0 to 5.8, and a dough mass having a pH value of about 5.3 is preferred. Moreover, a higher pH value might be availed of, e. g. up to 7.5 and 8.0.

Further, the flavor of the baked product may be improved and approach that of yeast leavened bread by incorporating into the dough batch a fermenting yeast suspension. This may be produced by preparing a water suspension of yeast containing sugar and a malt product, allowing it stand at 30° C. for about three hours, and then introducing into the dough. The dough may be mixed in the inert gas, for example, and more particularly, dimethyl ether and methyl chloride under pressure and is baked immediately thereafter.

Manufacture of bread may be carried out by preparing a dough containing for each leaf of about 1 lb., 300 grams of flour, water 62% based on the weight of the flour, salt 1.66%, sugar 5% and shortening 3.33%. The ingredients are placed in a suitable mixer, as a Readco vacuum-pressure mixer, and mixed therein for a period of about six minutes. The mixing is effected in the presence, e. g., of dimethyl ether under a pressure from about 5 to 8 lbs. per square inch gauge, or of methyl chloride under pressure of about 20 lbs., and at a temperature of about 80° F. Following mixing, the dough is placed in a pan and immediately baked for about thirty-five minutes at a temperature of about 210° C. The baked loaf is then permitted to cool, whereupon it may be weighed and wrapped.

The bread leavened with e. g., dimethyl ether or methyl chloride, possesses a taste which is somewhat different from that of yeast leavened bread, and in order to impart thereto a taste which is like unto that of yeast there may be included in the mix an edible acid substance or an ester, glycerol and alcohol, as above indicated. The loaves obtained with dimethyl ether were characterized by having good volume, a light crust color and a rather open but satisfactory texture, and those with methyl chloride were of satisfactory volume with a uniform and good texture, and a well browned crust color. It is thus demonstrated that a satisfactory bread may be made without yeast by mixing the dough in the presence of an inert gas of relatively high solubility in water, i. e., in ratio, of at least four volumes of the gas to one volume of water, and under a pressure which may be at least five pounds per square inch.

Other ingredients than those hereinbefore mentioned may be present in the dough, such as hydrogen peroxide, preferably of 30% strength, a fermenting yeast suspension which may be boiled before addition, lecitho-protein and milk powder. The lecitho-protein may be added in an amount of about 2%, and the milk powder about 6%, based on the weight of the flour. Malt may be utilized in place of a part or all of the sugar.

The procedure for the manufacture of leavened baked goods without the utilization of yeast and wherein the doughs are mixed in the presence of an inert gas under pressure leads to finished products which are like in general characteristics to those obtained by leavening with yeast. This is attained by a correlation of conditions which include forming a dough by mixing ingredients for a period of at least six minutes, the dough having an absorption value of from 54 to 66%, in the presence of an inert gas, e. g. dimethyl ether and methyl chloride under suitable pressure. Moreover, the temperature of the dough may be from about 60° to 90° F., and the dough is baked substantially immediately at a temperature of about 210° C. for thirty-five minutes.

Further, the gluten may be conditioned by including, among the dough ingredients, a proteolytic enzyme and/or a bromate. If a yeast-like aroma and flavor are desired, the ingredients may contain a compound or compounds, such as arises in yeast fermentation of a dough, or an edible acid substance. The dough resulting from the mixing is well leavened, light and fluffy in appearance, and the baked product is tender, palatable, with the appearance and feel of a yeast leavened product.

Moreover, a control of the effect of proteolytic enzymes may be accomplished through the utilization of oxygen or of air under pressure. The oxygen or the air preferably may be employed in suitable admixture with the gas, depending upon the result desired.

In our copending application Serial No. 309,346, now Patent 2,326,134, granted August 10, 1943, of which this application is in part a continuation, we have described and claimed a procedure for the production of baked goods without yeast, in which the leavening action is brought about through the use of relatively water insoluble gases, particularly carbon dioxide and nitrogen, under relatively high pressure conditions, i. e., upwards of 20 lbs. per square inch gauge.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A method for the production of baked goods leavened without yeast, which comprises admixing flour, water and other ingredients to form a dough, the amount of water being sufficient to give an absorption of 54 to 66% in the presence of an inert gas having a solubility, at atmospheric pressure and a temperature of 20° C., in water of at least four to one, said mixing being effected at a pressure which incorporates an effective amount of the gas into the dough and at a temperature of 60° to 90° F., and then baking substantially immediately.

2. A method for the production of baked goods leavened without yeast, which comprises admixing flour, water and other ingredients to form a dough, the amount of water being sufficient to give an absorption of 54 to 66% in the presence of an inert gas having a solubility, at atmospheric pressure and a temperature of 20° C., in water of at least four to one, said mixing being effected at a pressure upwards from about five pounds per square inch whereby an effective amount of the gas is incorporated into the dough, and at a temperature of 60° to 90° F., and then baking substantially immediately.

3. A method for the production of baked goods leavened without yeast, which comprises admixing flour, water and other ingredients including an edible acid substance having a yeast simulating flavor to form a dough, the amount of water being sufficient to give an absorption of 54 to 66%, in the presence of an inert gas having a solubility, at atmospheric pressure and a temperature of 20° C., in water of at least four to one, said mixing being effected at a pressure which incorporates an effective amount of the gas into the dough and at a temperature of 60 to 90° F., and then baking substantially immediately.

4. A method for the production of baked goods leavened without yeast, which comprises admixing flour, water and other ingredients to form a dough, the amount of water being sufficient to give an absorption of 58 to 62%, in the presence of an inert gas having a solubility, at atmospheric pressure and a temperature of 220° C., in water of at least four to one, said mixing being effected at a pressure upwards from about five pounds per square inch whereby an effective amount of the gas is incorporated into the dough, and at a temperature of about 80° F., said dough having a pH value from about 5.0 to about 5.8, and then baking substantially immediately.

5. A process as defined in claim 1 in which the inert gas is dimethyl ether.

6. A process as defined in claim 1 in which the inert gas is methyl chloride.

JACOB FREILICH.
CHARLES N. FREY.

CERTIFICATE OF CORRECTION.

Patent No. 2,382,305. August 14, 1945.

JACOB FREILICH, ET AL.

It is hereby certified that error appears in the printed specification of the above numbered patent requiring correction as follows: Page 2, second column, line 74, claim 4, for "of 220° C." read --of 20° C.--; and that the said Letters Patent should be read with this correction therein that the same may conform to the record of the case in the Patent Office.

Signed and sealed this 18th day of December, A. D. 1945.

Leslie Frazer
First Assistant Commissioner of Patents.

(Seal)

effected at a pressure upwards from about five pounds per square inch whereby an effective amount of the gas is incorporated into the dough, and at a temperature of about 80° F., said dough having a pH value from about 5.0 to about 5.8, and then baking substantially immediately.

5. A process as defined in claim 1 in which the inert gas is dimethyl ether.
6. A process as defined in claim 1 in which the inert gas is methyl chloride.

JACOB FREILICH.
CHARLES N. FREY.

CERTIFICATE OF CORRECTION.

Patent No. 2,382,305. August 14, 1945.

JACOB FREILICH, ET AL.

It is hereby certified that error appears in the printed specification of the above numbered patent requiring correction as follows: Page 2, second column, line 74, claim 4, for "of 220° C." read --of 20° C.--; and that the said Letters Patent should be read with this correction therein that the same may conform to the record of the case in the Patent Office.

Signed and sealed this 18th day of December, A. D. 1945.

Leslie Frazer
First Assistant Commissioner of Patents.

(Seal)